US012412220B2

(12) United States Patent
Becker et al.

(10) Patent No.: US 12,412,220 B2
(45) Date of Patent: Sep. 9, 2025

(54) DIGITAL PLATFORM FOR CONNECTING INSURANCE RELATED TRANSACTIONS

(71) Applicant: EIG Services, Inc., Reno, NV (US)

(72) Inventors: David S. Becker, Roseville, CA (US); Daniel Lorenzo Cerna, Temecula, CA (US); Graig Mickelson, Grain Valley, MO (US); David Trudeau, Pasadena, CA (US); Christopher Bradley ZiCornell, Austin, TX (US)

(73) Assignee: EIG SERVICES, INC., Henderson, NV (US)

( * ) Notice: Subject to any disclaimer, the term of this patent is extended or adjusted under 35 U.S.C. 154(b) by 0 days.

(21) Appl. No.: 18/953,497

(22) Filed: Nov. 20, 2024

(65) Prior Publication Data

US 2025/0078170 A1 Mar. 6, 2025

Related U.S. Application Data

(63) Continuation of application No. PCT/US2023/030066, filed on Aug. 11, 2023.

(60) Provisional application No. 63/371,619, filed on Aug. 16, 2022.

(51) Int. Cl.
 *G06Q 40/08* (2012.01)
(52) U.S. Cl.
 CPC .................................. *G06Q 40/08* (2013.01)
(58) Field of Classification Search
 CPC ....................................................... G06Q 40/08
 See application file for complete search history.

(56) References Cited

U.S. PATENT DOCUMENTS

| 9,805,338 | B1 | 10/2017 | Ghosn et al. |
| 2002/0188484 | A1* | 12/2002 | Grover ................... G06Q 40/08 705/4 |
| 2012/0116999 | A1 | 5/2012 | Mercier et al. |
| 2013/0346114 | A1 | 12/2013 | Ziade et al. |
| 2018/0357726 | A1 | 12/2018 | Besman et al. |
| 2019/0057454 | A1 | 2/2019 | Komenda et al. |

(Continued)

FOREIGN PATENT DOCUMENTS

| CA | 3220786 A1 * | 12/2022 |
| WO | WO-2024039581 A1 | 2/2024 |

OTHER PUBLICATIONS

PCT/US2023/030066 International Search Report and Written Opinion dated Nov. 17, 2023.

*Primary Examiner* — Edward Chang
(74) *Attorney, Agent, or Firm* — WILSON SONSINI GOODRICH & ROSATI

(57) ABSTRACT

Described is a digital platform for facilitating insurance-related transactions using an integrated application programming interface (API). Insurance may include workers' compensation insurance. The integrated API may include a representational state transfer (REST) API that integrates many different transactions into the platform. Transactions may include transactions between insurance agencies and agents, comparative rating entities, companies having insurance needs, or direct consumers having insurance needs. Transactions may include providing of quotes (quoting), finalizing or binding of quotes, managing policies, or pulling of support data. Actions associated with transactions may include creating a quote, getting quote status, getting policy status, or getting class appetite.

22 Claims, 10 Drawing Sheets

(56) References Cited

U.S. PATENT DOCUMENTS

2021/0248682 A1\* 8/2021 Lebor ................. G06Q 40/08
2021/0256622 A1   8/2021 Hartley et al.

\* cited by examiner

DIGITAL PLATFORM FOR CONNECTING INSURANCE RELATED TRANSACTIONS

CROSS-REFERENCE TO RELATED APPLICATIONS

This application is a continuation of International Application No. PCT/US2023/030066, filed Aug. 11, 2023, which claims the benefit of U.S. Provisional Application No. 63/371,619, filed Aug. 16, 2022, each of which is incorporated by reference herein in its entirety.

BACKGROUND

Many states require employers to provide workers' compensation insurance for their employees. Yet, the requirements may be confusing because workers' compensation insurance laws and requirements vary by state. Also, penalties for noncompliance may include fines, criminal charges, or jail time so regulatory compliance is important for an employer. However, providing workers' compensation insurance for employees may be especially burdensome on a small company due to, for example, transaction costs in acquiring, managing, and using insurance policies. Transaction costs may be associated with, for example, researching insurance quotes, providing of quotes (quoting), finalizing/binding of quotes that then become policies, managing quotes and policies, and/or supporting quotes and policies with data, or a combination thereof. Direct consumers, such as self-employed individuals or contractors, may experience similar burdens.

Unfortunately, the state of affairs for small companies and/or direct consumers to acquire, manage, and use workers' compensation insurance reveals different approaches that are deficient. Deficiencies arise from, for example, the many people-centric actions necessary for insurance-related transactions. First, a small company and/or a direct consumer may not be staffed and organized to understand the laws and requirements of the state in which the company or consumer operates and to then comply with those laws and requirements. Further, a small company and/or a direct consumer may not understand how the activities of the company and its employees or the activities of the consumer relate to risk and therefore impact the cost of a quote resulting in a policy. Risk factors that have the largest impact on the cost may include, for example, the type of risk associated with a company's or a consumer's business operations, a company's or a consumer's annual payroll, a company's or a consumer's prior claims history, or a number of other factors. Additionally, a small company and/or a direct consumer may not be staffed and organized to manage a quote and a resulting policy when an insurance claim is filed by the company's employee(s) or when the direct consumer files an insurance claim. Also, a small company and/or a direct consumer may not be staffed and organized to understand the data requirements needed to provide a quote and update a related policy. Finally, workers' compensation insurance also benefits a small company's employees and also benefits a direct consumer who depend on the insurance for lost wages, medical treatment, physical therapy, behavioral health, and/or death benefits, or a combination thereof.

For at least these reasons, such waste of resources, time, and money reduces a company's and/or a direct consumer's ability to invest in improving its products or services or to invest in its employees by providing workers' compensation insurance.

SUMMARY

The present disclosure can address at least these issues, for example, by providing an integrated digital agency service, application programming interface (DAS API) that facilitates and automates insurance-related transactions. The DAS API benefits insurance agencies and agents, third party comparative entities, companies having insurance needs, and/or direct consumers having needs by, for example, reducing the burden and transaction costs of researching insurance quotes, providing of quotes (quoting), finalizing/binding of quotes that then become policies, managing quotes and policies, and/or supporting quotes and policies with data, or a combination thereof. Also, the DAS API benefits employees and direct consumers who depend on the insurance for lost wages, medical treatment, physical therapy, behavioral health, and/or death benefits, or a combination thereof. Reducing waste of resources, time, and money improves a company's and/or a direct consumer's ability to invest in improving its products or services or to invest in its employees by providing workers' compensation insurance.

In an aspect, the present disclosure provides a platform for facilitating insurance-related transactions, the platform comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and (4) one or more direct consumers that have insurance needs.

In some embodiments, the integrated API is configured to connect directly with other partner APIs that are associated with the (1) one or more insurance agencies and agents and/or (2) the one or more third party comparative rating entities.

In some embodiments, the insurance-related transactions comprise a workflow that includes pre-bind and post-bind activities for quotes, wherein the pre-bind activities include pre-quotes and actual quoting.

In some embodiments, the insurance-related transactions or insurance needs relate to or include workers' compensation insurance.

In some embodiments, the integrated API is configured to enable the different types/groups of users to carry out the insurance-related transactions substantially in real-time directly through the users' own systems or APIs, thereby allowing manual and/or redundant data entry on the individual systems to be bypassed or eliminated.

In some embodiments, the integrated API is a representational state transfer (REST) interface that allows integration and exchange of data associated with the insurance-related transactions amongst the different types/groups of users.

In some embodiments, the platform is implemented as an Insurance-as-a-Service (IaaS) over a cloud network.

In some embodiments, the insurance-related transactions that are conducted using the platform include providing of quotes (quoting), finalizing/binding of quotes, policy management, and pulling of support data.

In some embodiments, the providing of quotes (quoting) is performed by the one or more insurance agencies and agents, in response to insurance-related inquiries or requests from (1) the one or more companies, (2) the one or more third party comparative rating entities, and/or (3) the one or more direct consumers. In some embodiments, the API is configured to push the quotes to (1) the one or more companies, (2) the one or more third party comparative rating entities, and/or (3) the one or more direct consumers. In some embodiments, the API is configured to enable the one or more third party comparative rating entities to push the quotes to the one or more companies and/or the one or more direct consumers.

In some embodiments, the platform is configured to enable the quotes to be finalized/bound in real time upon acceptance of the quotes by the one or more companies and/or the one or more direct consumers through the platform. In some embodiments, the platform is configured to facilitate transfer of insurance premium payments upon the quotes being finalized/bound.

In some embodiments, the policy management comprises access to policy documents, endorsements, renewals and/or other related aspects. In some embodiments, the support data comprises questions, responses to questions, rate classes, reservation and/or other types of data.

In some embodiments, the integrated API is configured to process and direct a plurality of request types, to generate a plurality of response types by, to or between the different types/groups of users. In some embodiments, the request types comprise one or more of the following quote-related actions: create quote, change quote, quote inquiry, quote not taken, bind quote, refer quote, list quote documents, add quote documents, delete quote documents, or get quote status. In some embodiments, the request types comprise one or more of the following policy-related actions: get policy documents, list policy documents, policy inquiry, list payment profile, or get policy status. In some embodiments, the request types comprise one or more of the following data management-related actions: validate agency code, validate agent code, get class appetite, list industry groups, get questions, or get state modifiers.

In another aspect, the present disclosure provides a computer-implemented system comprising: a digital processing device comprising: at least one processor, an operating system configured to perform executable instructions, a memory, and a computer program including instructions executable by the digital processing device to create an application comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and/or (4) one or more direct consumers that have insurance needs.

In another aspect, the present disclosure provides a non-transitory computer-readable storage media encoded with a computer program including instructions executable by a processor to create an application comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and/or (4) one or more direct consumers that have insurance needs.

In another aspect, the present disclosure provides a computer-implemented platform comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and/or (4) one or more direct consumers that have insurance needs.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2A depicts request types, e.g., quote-related request types, policy-related request types, or data management-related request types. FIG. 2B depicts example actions related to, for example, request types. FIG. 2C depicts example actions related to, for example, quote-related request types. FIG. 2D depicts example actions related to, for example, policy-related request types. FIG. 2E depicts example actions related to, for example, data management-related request types;

DETAILED DESCRIPTION

Figure 1:
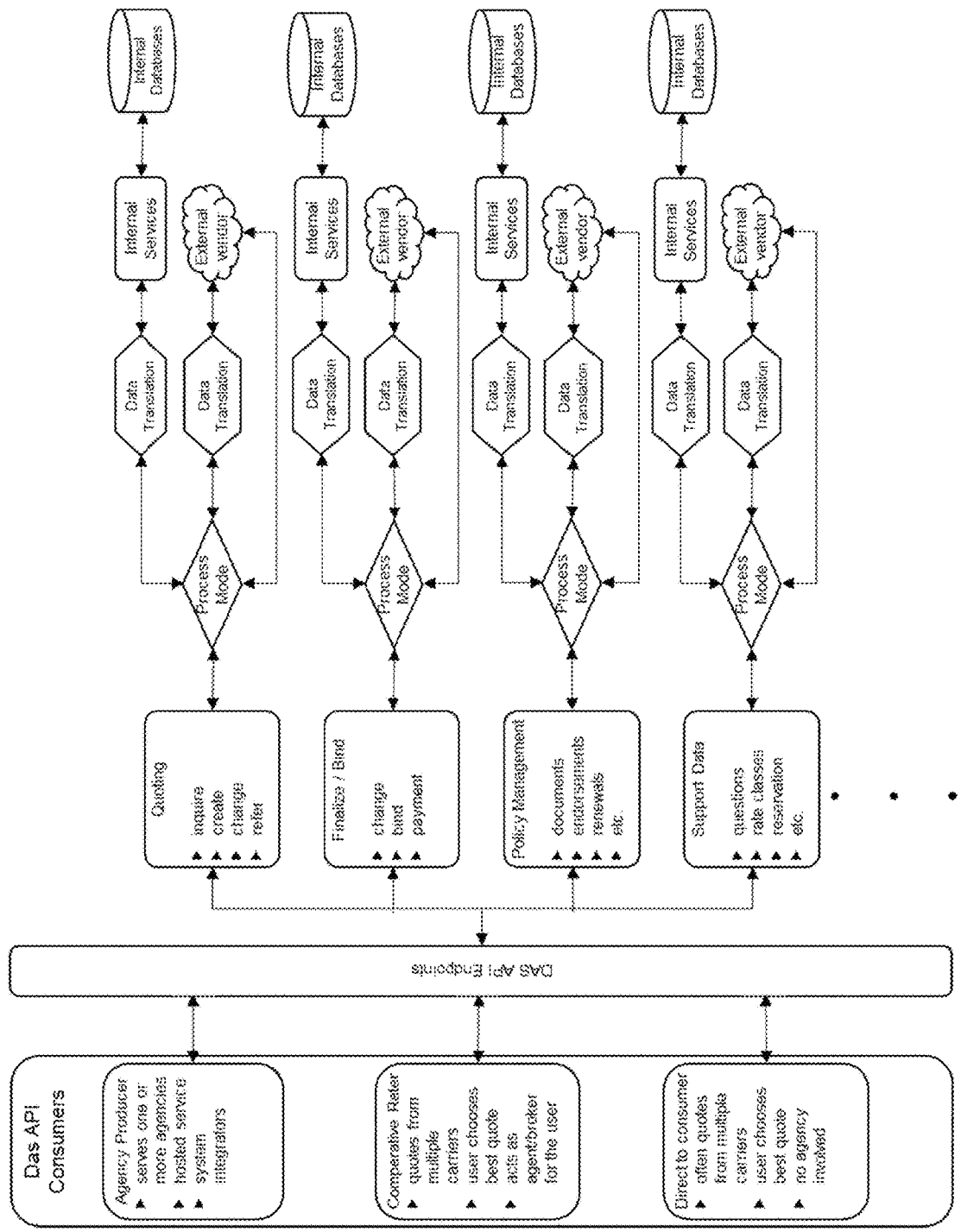
FIG. 1 depicts an example flow diagram of the platform described herein.

While various embodiments of the present disclosure have been shown and described herein, it will be obvious that such embodiments are provided by way of example only. Numerous variations, changes, and substitutions may occur without departing from the present disclosure. It can be understood that various alternatives to the embodiments of the present disclosure described herein may be employed.

Recognized herein is a need for a platform for facilitating insurance-related transactions, the platform comprising: an integrated application programming interface (API) that is configured to enable different types/groups of users to connect to, and/or utilize a same backend service architecture for a variety of insurance-related transactions. The different types/groups of users may comprise, for example, (1) one or more insurance agencies and agents associated with said agencies, (2) one or more third party comparative rating entities, (3) one or more companies that have insurance needs, and (4) one or more direct consumers that have insurance needs.

The integrated API may be viewed as a digital agency service API (DAS API) that reduces or eliminates human actions by automating some or all actions related to insurance-related transactions. The DAS API benefits insurance agencies and agents, third party comparative entities, companies having insurance needs, and/or direct consumers having insurance needs by, for example, reducing the burden and cost of researching insurance quotes, providing of quotes (quoting), finalizing/binding of quotes that then become policies, managing quotes and policies, and/or supporting quotes and policies with data, or a combination thereof. Also, the DAS API benefits employees and/or direct consumers who depend on the insurance for lost wages, medical treatment, physical therapy, behavioral health, and/or death benefits, or a combination thereof. Reducing waste of resources, time, and money improves a company's and/or a direct consumer's ability to invest in improving its products or services or to invest in its employees by providing workers' compensation insurance.

Further, the DAS API facilitates and automates many different types of requests and responses related to insurance-related transactions through the platform described herein. For example, requests and responses may include quote-related requests and responses such as create quote or get quote status. Requests and responses may include policy-related requests and responses such as list policy documents or get policy status. Requests and responses may include data management-related requests and responses such as validate agency code or get class appetite. Additionally, the DAS API facilitates and automates many different types of transactions received through a plurality of partner APIs by transforming partner API data and then performing the insurance-related transactions on the platform described herein. Partner APIs may include, for example, an Intuit® API or an Attune™ API.

Insurance agencies and agents may include, for example, an agency or agent that services one or more agencies or agents, an agency or agent that operates as a hosted service, and/or an agency or agent that operates as a system integrator, or a combination thereof. Third party comparative rating entities may include, for example, rating entities that provide quotes from multiple agencies, rating entities that allow a user to choose a best quote, and/or rating entities that act as an agent or broker for a user when obtaining a quote, or combination thereof. Companies that have insurance needs may include, for example, sole proprietorships, partnerships, limited liability companies, and/or corporations. Companies may include, for example, a small company that needs and/or wants workers' compensation insurance. Direct consumers, or direct-to-consumers, may include, for example, self-employed individuals or individual contractors who have insurance needs. Direct consumers may require insurance, e.g., workers' compensation insurance to, e.g., fulfill terms of a service contract or guard against medical bills and lost wages. Direct consumers may or may not be associated with the (1) one or more insurance agencies and agents associated with said agencies, (2) one or more third party comparative rating entities, and/or (3) one or more companies that have insurance needs. Direct consumers may or may not use an agency for insurance-related transactions. Direct consumers may use the integrated API described herein to facilitate insurance-related transactions.

DAS API Platforms

In an embodiment, the integrated API may be configured to connect directly with other partner APIs that are associated with the (1) one more insurance agencies and agents and/or (2) the one or more third party comparative rating entities. Alternatively, or in addition to, a company or a direct consumer may use a partner API to connect directly to the integrated API described herein. The integrated API (also DAS API) may, for example, provide a user an ability to communicate a request through the DAS API structured in the API's request body. The DAS API may, for example, communicate a response to a user through the DAS API structured in the API's response body. Partner APIs may include, for example, public APIs and private APIs. Public APIs may include, for example, social media APIs like Twitter®, third-party login APIs that allow a user to log in to the user's account using third-party party like Google®, or ecommerce APIs that allow a user to pay for a product or service with a third-party like PayPal®. Private APIs may include, for example, streaming service APIs that allow a user to stream content on any device from content providers like Netflix® or financial APIs that allow a user to access financial information from disparate sources such as banking and insurance information from banks like USAA®.

In another embodiment, the insurance-related transactions comprise a workflow that includes pre-bind and post-bind activities for quotes, wherein the pre-bind activities include pre-quotes and actual quoting. Additionally, as shown in FIG. 1, the workflow may include other high-level activities, for example, providing of quotes (quoting), finalizing/binding of quotes, policy management, and/or pulling of support data, or a combination thereof. Pre-bind activities may include activities related to, for example, quote-related request types and data management-related request types. Post-bind activities may include activities related to, for example, policy-related request types and data management-related request types. Also, as shown in FIG. 1, the workflow may include modules supporting the high-level activities of the backend service architecture, for example, a process mode module, a data translation module, an internal services module, or an internal databases module, or a combination thereof. The process mode module may, for example, determine whether an insurance-related transaction is requested through the platform described herein or whether a transaction is initially requested through a partner API. If the transaction is requested through the platform described herein, then the workflow activities may include, for example, translating data, converting to API JavaScript® Object Notation (JSON), using internal services, or saving data to the internal database of the backend architecture of the platform described herein. If the transaction is initially requested through a partner API, then the workflow may include, for example, translating the data for use by the platform described herein, using internal services, or saving to the internal database of the backend architecture of the platform described herein. Translating data may be required when a partner API uses a simple object access protocol (SOAP) API interface, a graph query language (GraphQL™) API interface using extensible markup language (XML), or an Association for Cooperative Operations Research and Development (ACORD™) API interface using XML, or combination thereof. The platform described herein translates the partner API data to API JSON for performing the insurance-related transactions in the backend service architecture.

In another embodiment, the insurance-related transactions or insurance needs relate to or include workers' compensation insurance. Additionally, insurance-related transactions or insurance needs may include, for example, life insurance, auto insurance, homeowner's insurance, renter's insurance, health insurance, disability insurance, long-term care insurance, identity theft insurance, and/or umbrella insurance, or a combination thereof.

In another embodiment, the integrated API is configured to enable the different types/groups of users to carry out the insurance-related transactions substantially in real-time directly through the users' own systems or APIs, thereby allowing manual and/or redundant data entry on the individual systems to be bypassed or eliminated. For example, data entry that may be bypassed or eliminated may include the name of the user, the password of the user, the location of the user (e.g., the address of primary place of business of an entity that the user represents), owner/officer, prior claims, the user's IP (Internet Protocol) address, the user's IP provider, and/or user metadata, or a combination thereof. Additionally, the user may update the data in real time so that data entry may be bypassed the next time the user carries out insurance-related transactions.

In another embodiment, the integrated API is a REST interface that allows integration and exchange of data associated with the insurance-related transactions amongst the different types/groups of users. The integrated API (or DAS API) may also use or otherwise translate data from, for example, a simple object access protocol (SOAP) API interface, a graph query language (GraphQL™) API interface using extensible markup language (XML), or an Association for Cooperative Operations Research and Development (ACORD™) API interface using XML, or a combination thereof. The representational state transfer (REST) API may include for example, a client-server architecture made up of clients, servers, and/or resources with requests managed through hypertext transfer protocol (HTTP), or combination thereof. The REST API may include, for example, a stateless client-server communication, cacheable data, a uniform interface between components, a layered system that organizes each type of server, and/or code-on-demand, or a combination thereof. The REST endpoints may be developed using, for example, JavaScript® Object Notation (JSON), comma separated value (CSV), and/or really simple syndication (RSS), or a combination thereof. The platform described herein may interface with SOAP APIs by extracting ACORD XML payload and converting to API JSON.

In another embodiment, the platform is implemented as an Insurance-as-a-Service (IaaS) over a cloud network. Cloud networks may include, for example, a public cloud, a private cloud, a hybrid cloud, and/or a multicloud, or a combination thereof. A public cloud may be, for example, Amazon® Web Services (AWS). Additionally, cloud networks may be structured with, for example, an operating system, a management platform, application APIs, virtualization software, and/or automation software, or a combination thereof. Cloud computing services may include, for example, infrastructure-as-a-service (IaaS), platforms-as-a-service (PaaS), and/or software-as-a-service (SaaS), or combination thereof.

In another embodiment, the insurance-related transactions that are conducted using the platform include providing of quotes (quoting), finalizing/binding of quotes, policy management, and pulling of support data. In an example, the providing of quotes (quoting) is performed by the one or more insurance agencies and agents, in response to insurance-related inquiries or requests from (1) the one or more companies, (2) the one or more third party comparative rating entities, and/or (3) the one or more direct consumers. As shown in FIG. 1, the providing of quotes (quoting) may include activities related to, for example, inquiring about quotes, creating quotes, changing quotes, or referring quotes, or a combination thereof. In an example, the API is configured to push the quotes to (1) the one or more companies, (2) the one or more third party comparative rating entities, and/or (3) the one or more direct consumers. In an example, the API is configured to enable the one or more third party comparative rating entities to push the quotes to the one or more companies and/or the one or more direct consumers.

In an example, the platform is configured to enable the quotes to be finalized/bound in real time upon acceptance of the quotes by the one or more companies and/or the one or more direct consumers through the platform. As shown in FIG. 1, the finalizing or binding of quotes may include activities related to, for example, changing quotes, binding quotes, or paying for quotes that become policies, or a combination thereof. In an example, the platform is configured to facilitate transfer of insurance premium payments upon the quotes being finalized/bound.

In an example, the policy management comprises access to policy documents, endorsements, renewals and/or other related aspects. In an embodiment, the support data comprises questions, responses to questions, rate classes, reservation and/or other types of data.

Request Types and Actions of DAS API Platforms

In another embodiment, the integrated API is configured to process and direct a plurality of request types, to generate a plurality of response types by, to or between the different types/groups of users. A user may communicate a request type through the integrated API (or DAS API) structured in the API's request header and/or request body. A user may receive a response type through the DAS API structured in the API's response header and/or response body. A request header may, for example, authenticate the user using a client identification and secret provided to the user when joining the platform described herein. Additionally, a request header may, for example, include language indicating the request type. For example, the request header may include the word, quote, when a create quote type is requested by a user. Depending on the request type, a request body may be required for the user to receive a response type or not be required to receive a response type. Depending on the response type, a response header may be provided to the user when receiving a response type or not be provided to the user when receiving a response type. A response body may provide the content of the response type to the user.

Figure 2A:
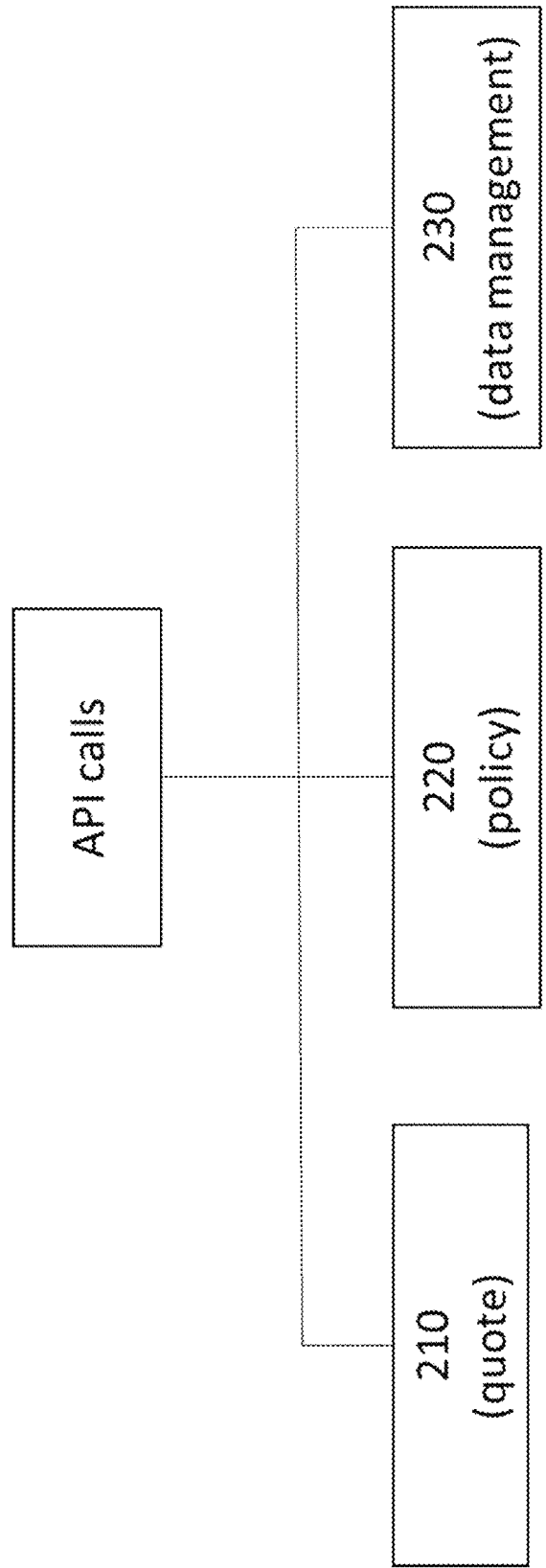
FIGS. 2A-2E depict an example flow diagram of insurance-related transactions described herein.
Figure 2B:
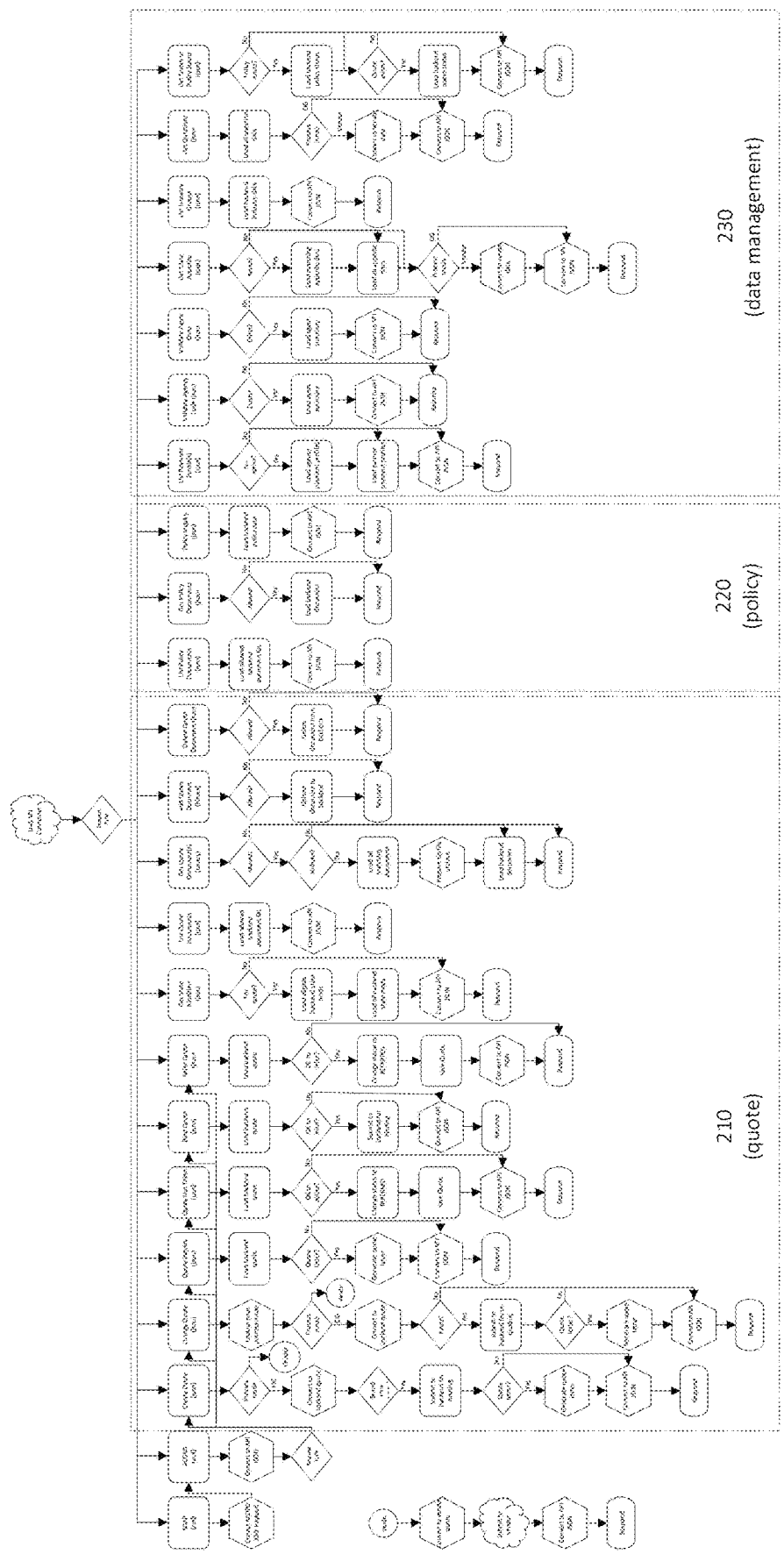

The request type and related response type are determined using the backend service architecture of the platform described herein. The request type and related response type may be categorized as, for example, quote-related request types, policy-related request types, or data management-related request types as shown in FIG. 2A. As shown in FIG.

2B, the platform contains a plurality of endpoints associated with a plurality of request types and a plurality of response types. The plurality of endpoints establish, for example, a location of the requested data within the backend service architecture of the platform described herein. Request types and the related response types may be grouped, for example, into requests related to quotes, requests related to policies, or requests related to data management. Each grouping comprises a plurality of related actions.

Quote-Related Actions

In another embodiment, the request types comprise one or more of the following quote-related actions: create quote, change quote, quote inquiry, quote not taken, bind quote, refer quote, list quote documents, add quote documents, delete quote documents, or get quote status.

Figure 2C:
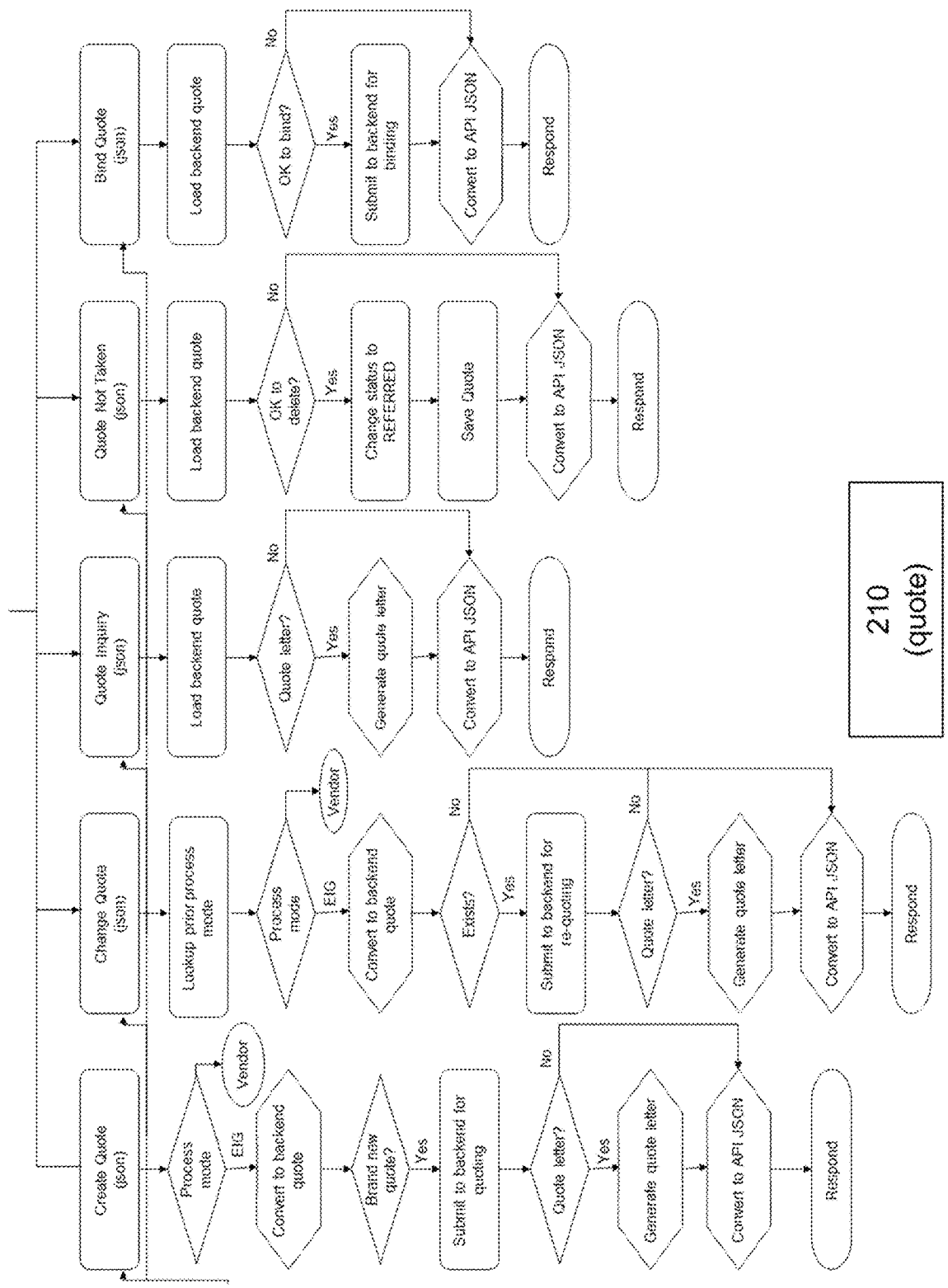
Figure 2C:
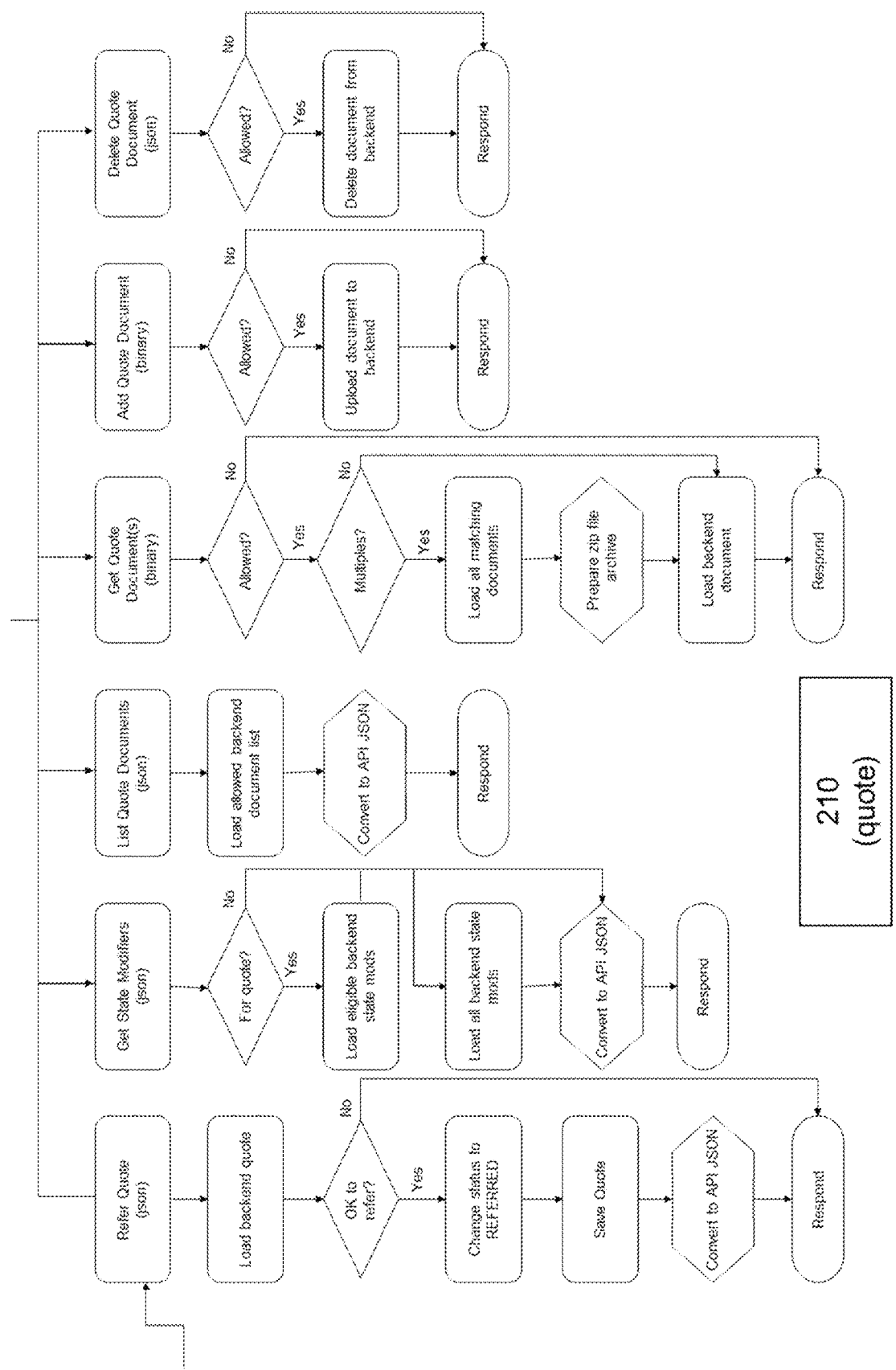

In an example, a quote-related request type may include a create quote type as shown in FIG. 2C. A user may request a new quote using the platform described herein. The create quote type is associated with an endpoint having a request header, a request body, and a response body. The request body of the create quote endpoint may include data about, for example, a policy, an applicant contact, a billing contact, a proposal contact, an agency, an agent, an association, named insureds, coverage limits, payment plans, prior losses, questions, disclaimers, and/or state modifiers, or combination thereof. The response body of the create quote endpoint may include the same or different data as the request body or additionally may include data about, for example, available payment plans, rating summary, and/or attachments, or a combination thereof. Also, the response body may include data about, for example, a quote's status, system messages, details, rating data, and/or relevant document attachments, or a combination thereof. After receiving the create quote type through the integrated API, the backend service architecture performs a plurality of actions to generate the response type. The plurality of actions may include, for example, determining the processing mode (e.g., the platform described herein or a partner API). If the processing mode is the platform described herein, then the plurality of actions may include converting to a backend quote, generating a new quote, submitting to the backend for quoting, generating or not generating a quote letter, converting to API JSON, or responding to the user, or a combination thereof. If the processing mode is a partner API, then the plurality of actions may include converting to the partner quote, submitting to the partner, converting to API JSON, or responding to the user, or a combination thereof.

In an example, a quote-related request type may include a change quote type as shown in FIG. 2C. A user may request to make changes to an existing quote rather than generating a new quote using the platform described herein. The change quote type is associated with an endpoint having a request header, a request body, and a response body. The request body of the change quote endpoint may include data about, for example, a policy, an applicant contact, a billing contact, a proposal contact, an agency, an agent, an association, named insureds, coverage limits, payment plans, prior losses, questions, disclaimers, and/or state modifiers, or combination thereof. The response body of the create quote endpoint may include the same or different data as the request body or additionally may include data about, for example, available payment plans, rating summary, and/or attachments, or a combination thereof. Also, the response body may include data about, for example, an updated quote status, system messages, details, rating data, and/or relevant document attachments, or a combination thereof. After receiving the change quote type through the integrated API, the backend service architecture performs a plurality of actions to generate the response type. The plurality of actions many include, for example, looking up the prior processing mode and determining the processing mode (e.g., the platform described herein or a partner API). If the processing mode is the platform described herein, then the plurality of actions may include converting to a backend quote and determining whether a quote already exists. If a quote already exists, then the plurality of actions may include submitting to backend for re-quoting, generating or not generating a quote letter, converting to API JSON, or responding to the user, or a combination thereof. If a quote does not already exist, the plurality of actions may include responding to the user. If the processing mode is a partner API, then the plurality of actions may include converting to the partner quote, submitting to the partner, converting to API JSON, or responding to the user, or a combination thereof.

In an example, a quote-related request type may include a quote inquiry type as shown in FIG. 2C. A user may request the status or details of a quote using the platform described herein. The quote inquiry type is associated with an endpoint having an optional request body but having a response body. The response body of the quote inquiry endpoint may include data about, for example, a policy, an applicant contact, a billing contact, a proposal contact, an agency, an agent, an association, named insureds, coverage limits, payment plans, prior losses, questions, disclaimers, and/or state modifiers, or combination thereof. Also, the response body may include data about, for example, the latest quote status, system messages, details, rating data, and/or relevant document attachments, or a combination thereof. After receiving the quote inquiry type through the integrated API, the backend service architecture performs a plurality of actions to generate the response type. The plurality of actions many include, for example, loading the backend quote, generating or not generating a quote letter, converting to API JSON, or responding to the user, or a combination thereof.

In an example, a quote-related request type may include a quote not taken type as shown in FIG. 2C. A user may request not to continue with binding a quote and instead delete the quote using the platform described herein. The quote not taken type is associated with an endpoint having an optional request body but having a response body. The response body of the quote not taken endpoint may include data about, for example, a policy, an applicant contact, a billing contact, a proposal contact, an agency, an agent, an association, named insureds, coverage limits, payment plans, prior losses, questions, disclaimers, and/or state modifiers, or combination thereof. Also, the response body may include data about, for example, not taken quote status, system messages, details, rating data, and/or relevant document attachments, or a combination thereof. After receiving the quote not taken type through the integrated API, the backend service architecture performs a plurality of actions to generate the response type. The plurality of actions may include, for example, loading the backend quote and determining whether to delete the quote. If the user elects to delete the quote, then the plurality of actions may include changing the status of the quote to referred for auditing purposes, saving the quote, converting to API JSON, or responding to the user, or a combination thereof. If the user elects not to delete the quote, then the plurality of actions may include converting to API JSON or responding to the user, or a combination thereof.

In an example, a quote-related request type may include a bind quote type as shown in FIG. 2C. A user may request to bind a quote and turn the quote into an actual policy after successful quoting or approval by underwriting using the platform described herein. The bind quote type is associated with an endpoint having an optional request body but having a response body. The response body of the bind quote endpoint may include data about, for example, a policy, an applicant contact, a billing contact, a proposal contact, an agency, an agent, an association, named insureds, coverage limits, payment plans, prior losses, questions, disclaimers, or state modifiers, or a combination thereof. Also, the response body may include data about, for example, the bound quote status, system messages, details, rating data, or relevant document attachments, or a combination thereof. After receiving the bind quote type through the integrated API, the backend service architecture performs a plurality of actions to generate the response type. The plurality of actions may include, for example, loading the backend quote and determining whether to bind the quote. If the user elects to bind the quote, then the plurality of actions may include submitting the quote to the backend for binding, converting to API JSON, or responding to the user, or combination thereof. If the user elects not bind the quote, then the plurality of actions may include converting to API JSON or responding to the user, or a combination thereof.

In an example, a quote-related request type may include a refer quote type as shown in FIG. 2C. A user may request to refer a quote that is pending referral so that the quote may be actually referred to underwriting for approval using the platform described herein. The refer quote type is associated with an endpoint having an optional request body but having a response body. The response body of the refer quote endpoint may include data about, for example, a policy, an applicant contact, a billing contact, a proposal contact, an agency, an agent, an association, named insureds, coverage limits, payment plans, prior losses, questions, disclaimers, or state modifiers, or a combination thereof. Also, the response body may include data about, for example, the referred quote status, system messages, details, rating data or relevant document attachments, or a combination thereof. After receiving the refer quote type through the integrated API, the backend service architecture performs a plurality of actions to generate the response type. The plurality of actions may include, for example, loading the backend quote and determining whether to refer the quote. If the user elects to refer the quote, then the plurality of actions may include changing the status of the quote to referred, saving the quote, converting to API JSON, or responding to the user, or a combination thereof. If the user elects not to refer the quote, then the plurality of actions may include responding to the user.

In an example, a quote-related request type may include a list quote documents type as shown in FIG. 2C. A user may request to retrieve documents related to a quote using a plurality of requests for documents using the platform described herein. For example, the user may request a specific document associated with a quote, a list of documents associated with a quote, a compressed file of all documents associated with a quote, one or more documents from a quote by document type code, a specific document associated with a provided policy number and document identification, or a list of documents associated with a provided policy number. The list quote documents type is associated with an endpoint having an optional request body but having a response header (e.g., showing the originally uploaded document name) and a response body. The response body of the list quote documents endpoint may include data about, for example, the document type, document identification, insured named, policy number, agency identification, creation date, recipient list, octet stream for a document, document type code, file name, file size, upload date, octet stream for a compressed file, or byte stream for a document, or a combination thereof. After receiving the list quote documents type through the integrated API, the backend service architecture performs a plurality of actions to generate the response type. The plurality of actions may include, for example, loading an allowed backend document list, converting to API JSON, or responding to the user, or a combination thereof.

In an example, a quote-related request type may include an add quote documents type as shown in FIG. 2C. A user may request to add documents to a quote using the platform described herein. Allowable document types may include, for example, .doc, .docx, .log, .msg, .odt, .rtf, .txt, .wpd, .csv, .dat, .pps, .ppt, .pptx, .bmp, .gif, .jpg, .png, .tif, .tiff, .pdf, .xlr, .xls, or .xlsx, or a combination thereof. The add quote document type is associated with an endpoint having a request body allowing multipart/form-data. The response body of the add quote document endpoint may include data about, for example, successful document upload or document identification, or a combination thereof. After receiving the add quote document type through the integrated API, the backend service architecture performs a plurality of actions to generate the response type. The plurality of actions may include, for example, determining whether the document type is an allowed document type, e.g., a .pdf. If the document type is allowed, then the plurality of actions may include uploading the document to the backend or responding to the user, or a combination thereof. If the document type is not allowed, then the plurality of actions may include responding to the user.

In an example, a quote-related request type may include a delete quote documents type as shown in FIG. 2C. A user may request to delete a document previously added to a quote using the platform described herein. The delete quote document type is associated with an endpoint having an optional request body. The response body of the delete quote document endpoint may include data about, for example, successful document deletion. After receiving the delete quote document type through the integrated API, the backend service architecture performs a plurality of actions to generate the response type. The plurality of actions may include, for example, determining whether deleting the document is allowed. If deleting the document is allowed, then the plurality of actions may include deleting the document from the backend or responding to the user, or a combination thereof. If deleting the document is not allowed, then the plurality of actions may include responding to the user.

Figure 2D:
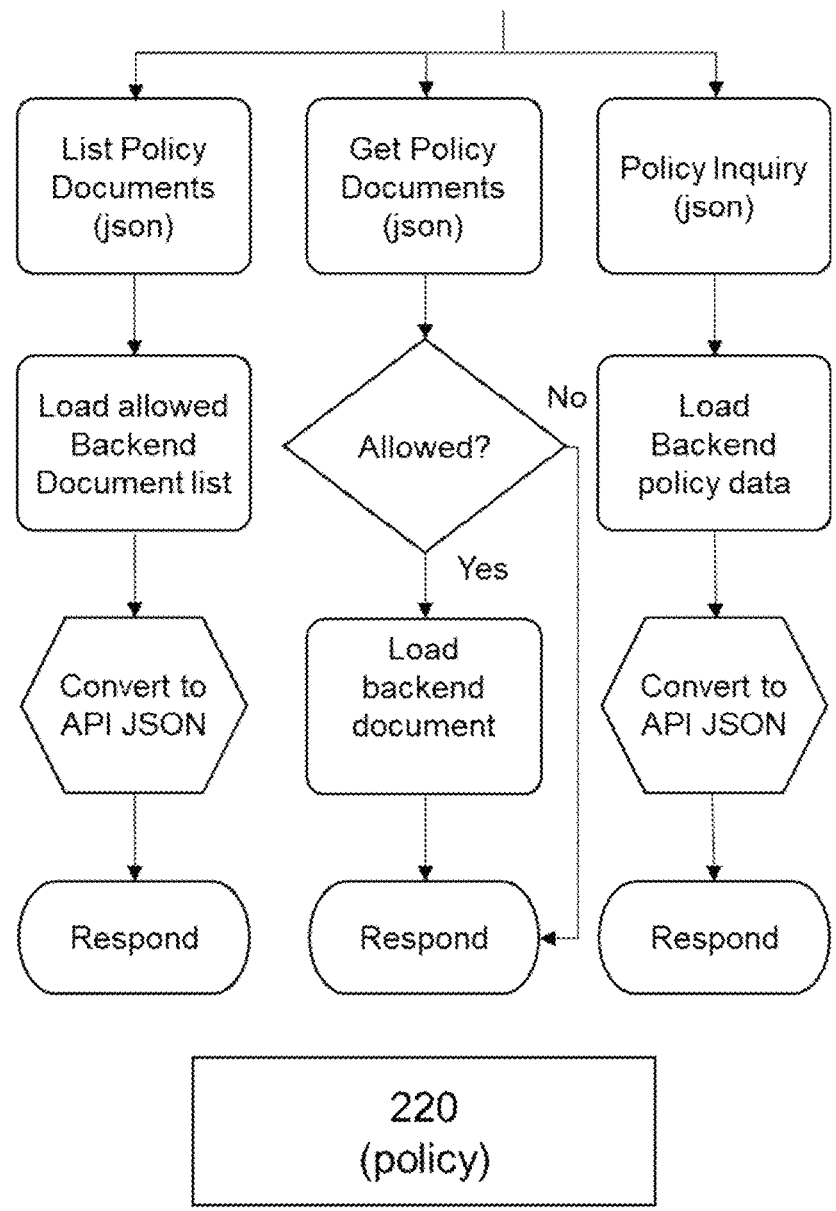
Figure 2E:
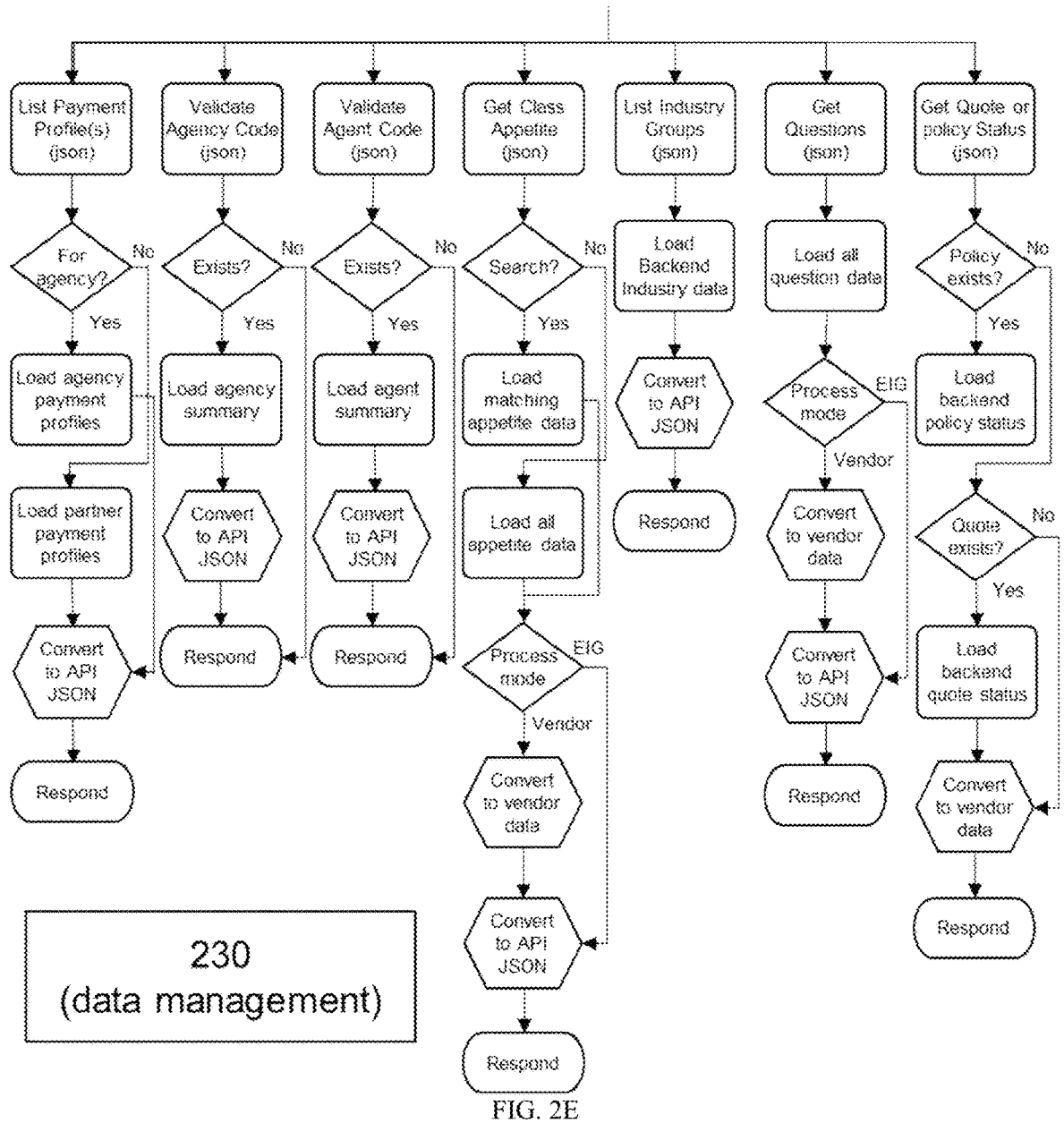

In an example, a quote-related request type may include a get quote status type as shown in FIG. 2E. A user may request to retrieve the current status of a quote using the platform described herein. The get quote status type is associated with an endpoint having an optional request body. The response body of the get quote status endpoint may include data about, for example, the quote identification number, the status of the quote, or an indetermination of the status, or a combination thereof. After receiving the get quote status type through the integrated API, the backend service architecture performs a plurality of actions to generate the response type. The plurality of actions may include, for example, determining whether a policy exists. If a policy exists, then the plurality of actions my include loading backend policy status, converting to API JSON, or responding to the user, or a combination thereof. If a policy does not exist, then the plurality of actions may include determining whether a quote exists. If a quote exists, then the plurality of actions may include loading backend quote status, converting to API JSON, or responding to the user, or a combination thereof. If a quote does not exist, then the plurality of actions may include converting to API JSON or responding to the user, or a combination thereof.

Policy-Relata Actions

In another embodiment, the request types comprise one or more of the following policy-related actions: get policy documents, list policy documents, policy inquiry, list payment profile, or get policy status.

In an example, a policy-related request type may include a get policy documents type as shown in FIG. 2D. A user may request to retrieve documents related to a policy using the platform described herein. The get policy documents type is associated with an endpoint having an optional request body but having a response header (e.g., document name as uploaded) and a response body. The response body of the get policy documents endpoint may include data about, for example, a document as byte stream. After receiving the get policy documents type through the integrated API, the backend service architecture performs a plurality of actions to generate the response type. The plurality of actions may include, for example, determining whether the policy documents are allowed to be retrieved. If retrieval is allowed, then the plurality of actions may include loading the backend policy document or responding to the user, or a combination thereof. If retrieval is not allowed, then the plurality of actions may include responding to the user.

In an example, a policy-related request type may include a list policy documents type as shown in FIG. 2D. A user may request to retrieve a list of documents associated with a policy using the platform described herein. The list policy documents type is associated with an endpoint having an optional request body but having a response body. The response body of the list policy documents endpoint may include data about, for example, document identification, document type, insured name, policy number, agency identification, creation date, or recipient list, or a combination thereof. After receiving the list policy documents type through the integrated API, the backend service architecture performs a plurality of actions to generate the response type. The plurality of actions may include, for example, loading an allowed backend document list, converting to API JSON, or responding to the user, or a combination thereof.

In an example, a policy-related request type may include a policy inquiry type as shown in FIG. 2D. A user may inquire about the status or details of a policy using the platform described herein. The policy inquiry type is associated with an endpoint having an optional request body but having a response body. The response body of the policy inquiry endpoint may include data about, for example, policy number, creation date, effective date, expiration date, cancellation date, reinstatement date, issued date, years in business, total premium, status, prior policy number, valuation date, agent, agency, payment plan, available payment plans, or named insureds, or a combination thereof. After receiving the policy inquiry type through the integrated API, the backend service architecture performs a plurality of actions to generate the response type. The plurality of actions many include, for example, loading backend policy data, converting to API JSON, or responding to the user, or a combination thereof.

In an example, a policy-related request type may include a list payment profile type as shown in FIG. 2E. A user may request to retrieve payment profiles related to a specific agency code or to retrieve payment profiles related to an authorized agency code using the platform described herein. The list payment profile type is associated with an endpoint having an optional request body but having a response body. The response body of the list payment profile endpoint may include data about, for example, customer number, account nickname, account type, last four characters of account number, or account token, or a combination thereof. After receiving the list payment profile type through the integrated API, the backend service architecture performs a plurality of actions to generate the response type. The plurality of actions many include, for example, determining whether the request is for an agency. If the request is for an agency, then the plurality of actions may include, loading agency payment profiles, converting to API JSON, or responding to the user, or a combination thereof. If the request is not for any agency, then the plurality of actions may include loading partner payment profiles, converting to API JSON, or responding to the user, or a combination thereof.

In an example, a policy-related request type may include ager policy status type as shown in FIG. 2E. A user may request to retrieve the current status of a policy using the platform described herein. The get policy status type is associated with an endpoint having an optional request body but having a response body. The response body of the get policy status endpoint may include data about, for example, the policy identification number, the status of the policy, or an indetermination of the status, or a combination thereof. After receiving the get policy status type through the integrated API, the backend service architecture performs a plurality of actions to generate the response type. The plurality of actions may include, for example, determining whether a policy exists. If a policy exists, then the plurality of actions my include loading backend policy status, converting to API JSON, or responding to the user, or a combination thereof. If a policy does not exist, then the plurality of actions may include determining whether a quote exists. If a quote exists, then the plurality of actions may include loading backend quote status, converting to API JSON, or responding to the user, or a combination thereof. If a quote does not exist, then the plurality of actions may include converting to API JSON or responding to the user, or a combination thereof.

Data Management-Related Actions

In another embodiment, the request types comprise one or more of the following data management-related actions: validate agency code, validate agent code, get class appetite, list industry groups, get questions, or get state modifiers.

In an example, a data management-related request type may include a validate agency code type as shown in FIG. 2E. A user may request to verify that an agency is an active agency using the platform described herein. The validate agency code type is associated with an endpoint having an optional request body but having a response body. The response body of the validate agency code endpoint may include data about, for example, the active agency code or an error in determining active agency or combination thereof. After receiving the validate agency code type through the integrated API, the backend service architecture performs a plurality of actions to generate the response type. The plurality of actions may include, for example, determining whether an agency code exists. If an agency code exists, then the plurality of actions my include loading agency summary, converting to API JSON, or responding to the user, or a combination thereof. If an agency code does not exist, then the plurality of actions may include responding to the user.

In an example, a data management-related request type may include a validate agent code type as shown in FIG. 2E. A user may request to verify that an agent is an active agent using the platform described herein. The validate agent code type is associated with an endpoint having an optional request body but having a response body. The response body of the validate agent code endpoint may include data about, for example, the active agency code, agent email, customer number, or an error in determining active agent, or a combination thereof. After receiving the validate agent code type through the integrated API, the backend service architecture performs a plurality of actions to generate the response type. The plurality of actions may include, for example, determining whether an agent code exists. If an agent code exists, then the plurality of actions my include loading agent summary, converting to API JSON, or responding to the user, or a combination thereof. If an agent code does not exist, then the plurality of actions may include responding to the user.

In an example, a data management-related request type may include a get class appetite type as shown in FIG. 2E. A user may request to retrieve the platform's appetite by state using the platform described herein. The get class appetite type is associated with an endpoint having an optional request body but having a response body. The response body of the get class appetite endpoint may include data about, for example, class code, class description, class industry, class operations, North American Industry Classification System (NAICS) code, NAICS description, companion class codes, appetite, or targeting, or a combination thereof. After receiving the get class appetite type through the integrated API, the backend service architecture performs a plurality of actions to generate the response type. The plurality of actions may include, for example, determining whether the user wants to retrieve specific appetites by a search or to retrieve all appetites. If specific appetites are desired, then the plurality of actions my include loading matching appetite data, processing the mode (e.g., the platform described herein or a partner API), converting to API JSON or converting to partner data, or responding to the user, or a combination thereof. If all appetites are desired, then the plurality of actions may include loading all appetite data, processing the mode (e.g., the platform described herein or a partner API), converting to API JSON or converting to partner data, or responding to the user, or a combination thereof.

In an example, a data management-related request type may include a list Industry groups type as shown in FIG. 2E. A user may request to retrieve all distinct industries associated with the platform's appetites using the platform described herein. The list industry groups type is associated with an endpoint having an optional request body but having a response body. The response body of the list industry groups endpoint may include data about, for example, distinct appetite industries. Industries may include, for example, accounting, apparel manufacturing, architecture, auto parts, auto services, banking, bars, beauty, chemical and electrical manufacturing, clerical, daycare, dry cleaning, fast food, food manufacturing, food services, funerals, gas stations, hotels, mailing, meat stores, medical services, miscellaneous manufacturing, photo, professional services, real estate, retail, schools, wholesale, winery, or wood manufacturing, or a combination thereof. After receiving the list industry groups type through the integrated API, the backend service architecture performs a plurality of actions to generate the response type. The plurality of actions may include, for example, loading backend industry data, converting to API JSON, or responding to the user, or a combination thereof.

In an example, a data management-related request type may include a get questions type as shown in FIG. 2E. A user may request to retrieve some or all questions with or without an effective date using the platform described herein. The get questions type is associated with an endpoint having an optional request body but having a response body. The response body of the get questions endpoint may include data about, for example, description of the question, industry code, industry, effective date of the question, state specific question, state exception, additional questions when positively answered, or additional questions when negatively answered, or a combination thereof. After receiving the get questions type through the integrated API, the backend service architecture performs a plurality of actions to generate the response type. The plurality of actions may include, for example, loading all question data and processing the mode (e.g., the platform described herein or a partner API). If the processing mode is the platform described herein, then the plurality of actions many include converting to API JSON or responding to the user, or a combination thereof. If the processing mode is a partner API, then the plurality of actions may include converting to partner data, converting to API JSON, or responding to the user, or a combination thereof.

In an example, a data management-related request type may include a get state modifiers type as shown in FIG. 2C. A user may request to retrieve all state modifiers that can be applied for a plurality of states with an optional effective date using the platform described herein. The get state modifiers type is associated with an endpoint having an optional request body but having a response body. The response body of the get state modifiers endpoint may include data about, for example, modifiers associated with a state, e.g., a label, a modifier type, textual help, minimum value of the modifier, or maximum value of the modifier, or a combination thereof. After receiving the get state modifiers type through the integrated API, the backend service architecture performs a plurality of actions to generate the response type. The plurality of actions may include, for example, determining whether the request is for a quote. If the request is for a quote, then the plurality of actions may include loading eligible backend state modifiers, converting to API JSON, or responding to the user, or a combination thereof. If the request is not for a quote, then the plurality of actions may include loading all backend state modifiers, converting to API JSON, or responding to the user, or a combination thereof.

In another embodiment, the present disclosure provides a computer-implemented system comprising: a digital processing device comprising: at least one processor, an operating system configured to perform executable instructions, a memory, and a computer program including instructions executable by the digital processing device to create an application comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and/or (4) one or more direct consumers that have insurance needs.

In another embodiment, the present disclosure provides a non-transitory computer-readable storage media encoded with a computer program including instructions executable by a processor to create an application comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and/or (4) one or more direct consumers that have insurance need.

In another embodiment, the present disclosure provides a computer-implemented platform comprising: an integrated application programming interface (API) that is configured to enable different types/groups of users to connect to, and/or utilize a same backend service architecture for a variety of insurance-related transactions, wherein the different types/groups of users comprise (1) one or more insurance agencies and agents associated with said agencies, (2) one or more third party comparative rating entities, (3) one or more companies that have insurance needs, and/or (4) one or more direct consumers that have insurance needs.

Terms and Definitions

Unless otherwise defined, all technical terms used herein have the same meaning as commonly understood.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Computing System

Figure 3:
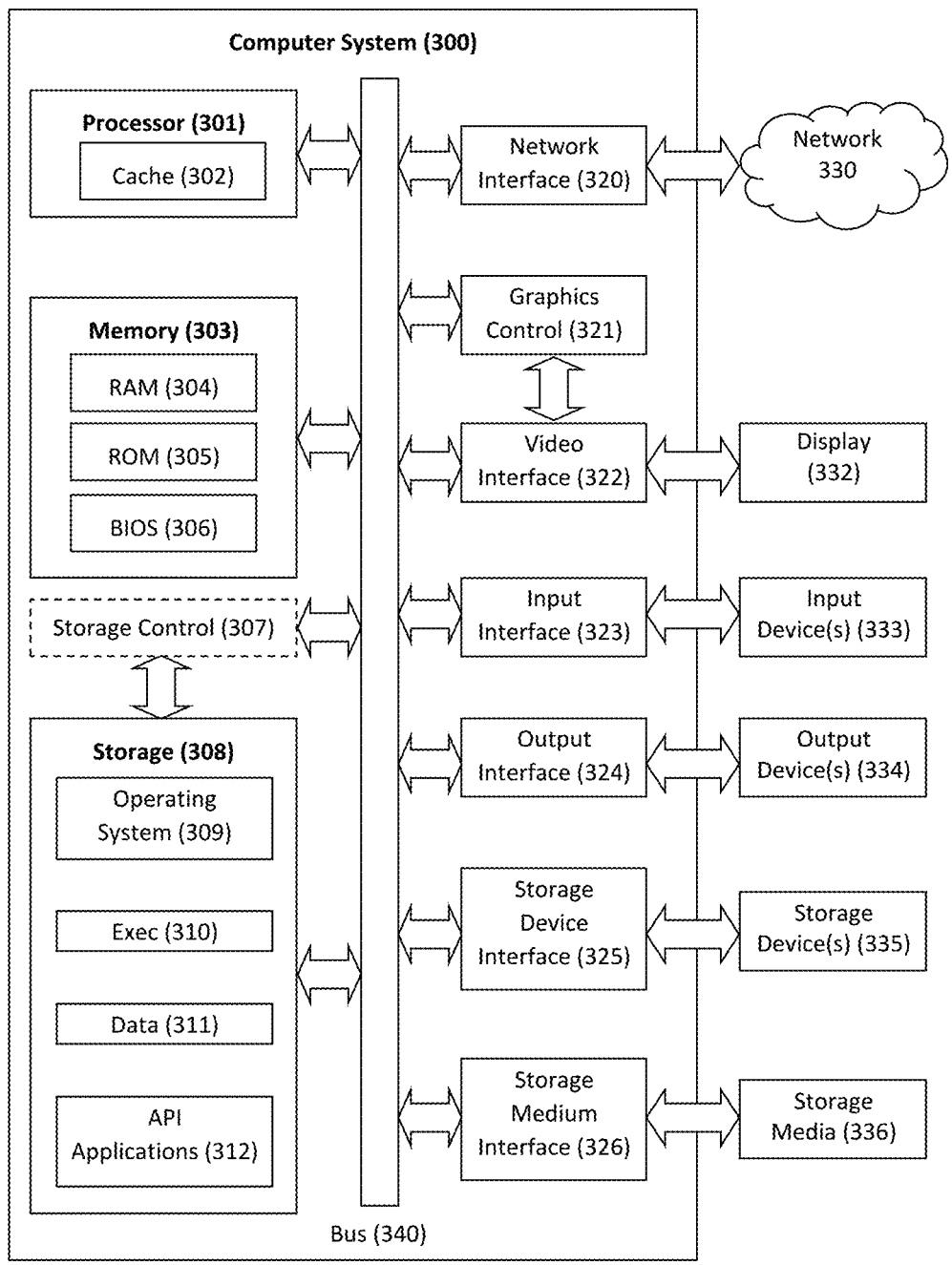
FIG. 3 depicts an example of a computing device.

Referring to FIG. 3, a block diagram is shown depicting an example platform that includes a computer system 300 (e.g., a processing or computing system) within which a set of instructions can execute for causing a device to perform or execute any one or more of the aspects of the platform described herein. The components in FIG. 3 are examples only and do not limit the scope of use or functionality of any hardware, software, embedded logic component, or a combination of two or more such components implementing particular embodiments.

Computer system 300 may include one or more processors 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 300 includes one or more processor(s) 301 (e.g., central processing units (CPUs) or general purpose graphics processing units (GPGPUs)) that carry out functions. Processor(s) 301 optionally contains a cache memory unit 302 for temporary local storage of instructions, data, or computer addresses. Processor(s) 301 are configured to assist in execution of computer readable instructions. Computer system 300 may provide functionality for the components depicted in FIG. 3 as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more operations of one or more processes described or illustrated herein. Carrying out such processes or operations may include defining data structures stored in memory 303 and modifying the data structures as directed by the software.

The memory 303 may include various components (e.g., machine readable media) including, but not limited to, a random access memory component (e.g., RAM 304) (e.g., static RAM (SRAM), dynamic RAM (DRAM), ferroelectric random access memory (FRAM), phase-change random access memory (PRAM), etc.), a read-only memory component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, executable(s) 310, data 311, applications 312 (application programs), and the like. Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide non-volatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 330, computer system 300 may communicate with other devices, specifically mobile devices and enterprise systems, distributed computing systems, cloud storage systems, cloud computing systems, and the like, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 330, may employ a wired and/or a wireless mode of communication. In general, any network topology may be used.

Information and data can be displayed through a display 332. Examples of a display 332 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 332, computer system 300 may include one or more other peripheral output devices 334 including, but not limited to, an audio speaker, a printer, a storage device, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition or as an alternative, computer system 300 may provide functionality as a result of logic hardwired or otherwise embodied in a circuit, which may operate in place of or together with software to execute one or more processes or one or more operations of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems include, by way of non-limiting examples, Microsoft Windows®, Apple® Mac OS X®, UNIX®, and UNIX-like operating systems such as GNU/Linux®. In some embodiments, the operating system is provided by cloud computing. Suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft Windows Mobile® OS, Linux®, and Palm® WebOS®. Suitable media streaming device operating systems include, by way of non-limiting examples, Apple TV®, Roku®, Boxee®, Google TV®, Google Chromecast®, Amazon Fire®, and Samsung® HomeSync®. Suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, a web application, in various embodiments, utilizes one or more software frameworks and one or more database systems. In some embodiments, a web application is created upon a software framework such as Microsoft® .NET or Ruby on Rails® (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. A web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript® and XML (AJAX), Flash® Actionscript, Javascript, or Silverlight®. In some embodiments, a web application is written to some extent in a server-side coding language such as Active Server Pages (ASP), ColdFusion®, Perl, Javam, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 4:
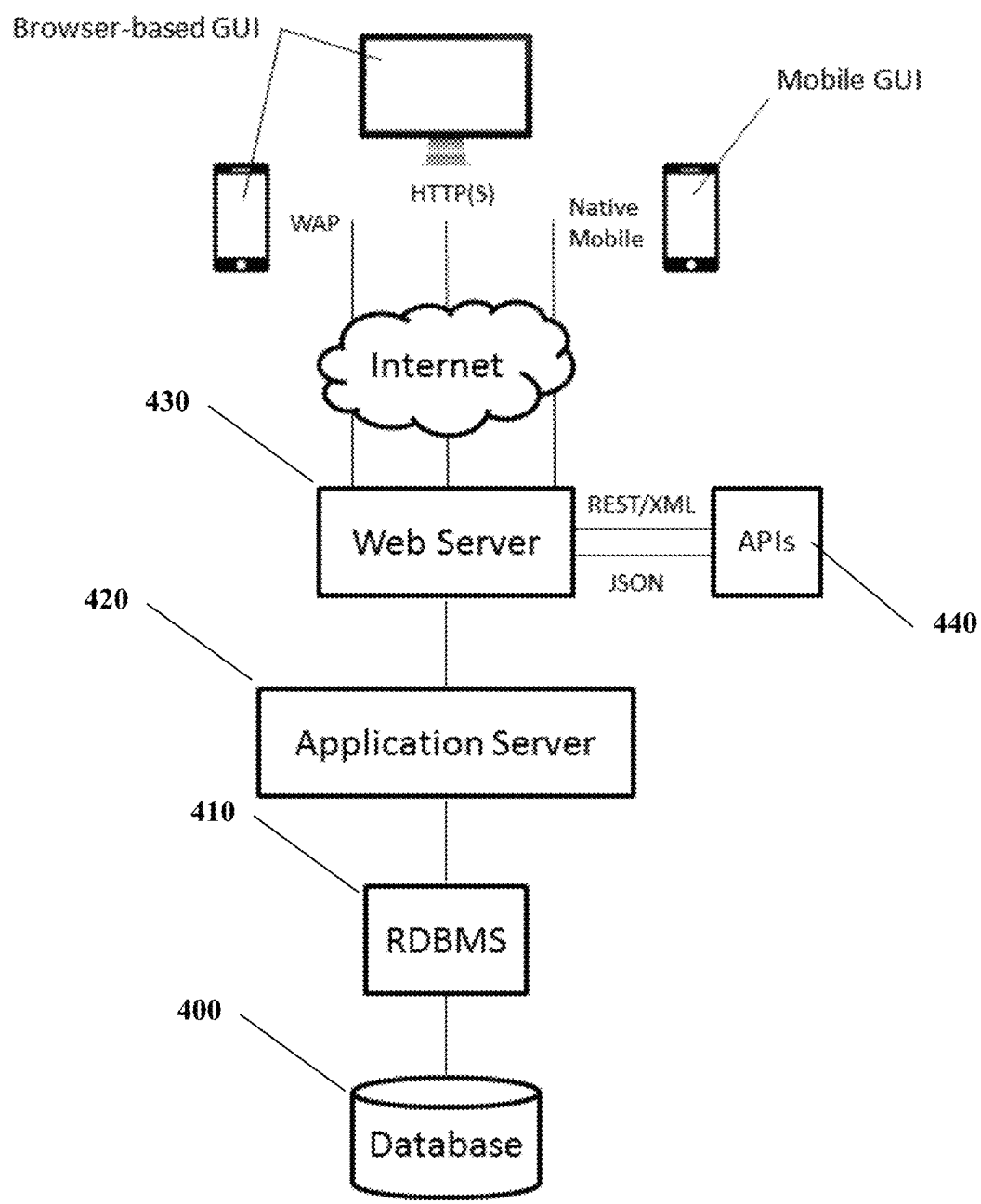
FIG. 4 depicts an example of a web/mobile application provision system.

Referring to FIG. 4, in a particular embodiment, an application provision system comprises one or more databases 400 accessed by a relational database management system (RDBMS) 410. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. Alternatively or additionally to an RDBMS, the application provision system comprises a NoSQL database, e.g., MongoDB®. In this embodiment, the application provision system further comprises one or more application severs 420 (such as Java servers, .NET servers, PHP servers, and the like) and one or more web servers 430 (such as Apache, IIS, GWS and the like). The web server(s) optionally expose one or more web services via app application programming interfaces (APIs) 440. Via a network, such as the Internet, the system provides browser-based and/or mobile native user interfaces.

Figure 5:
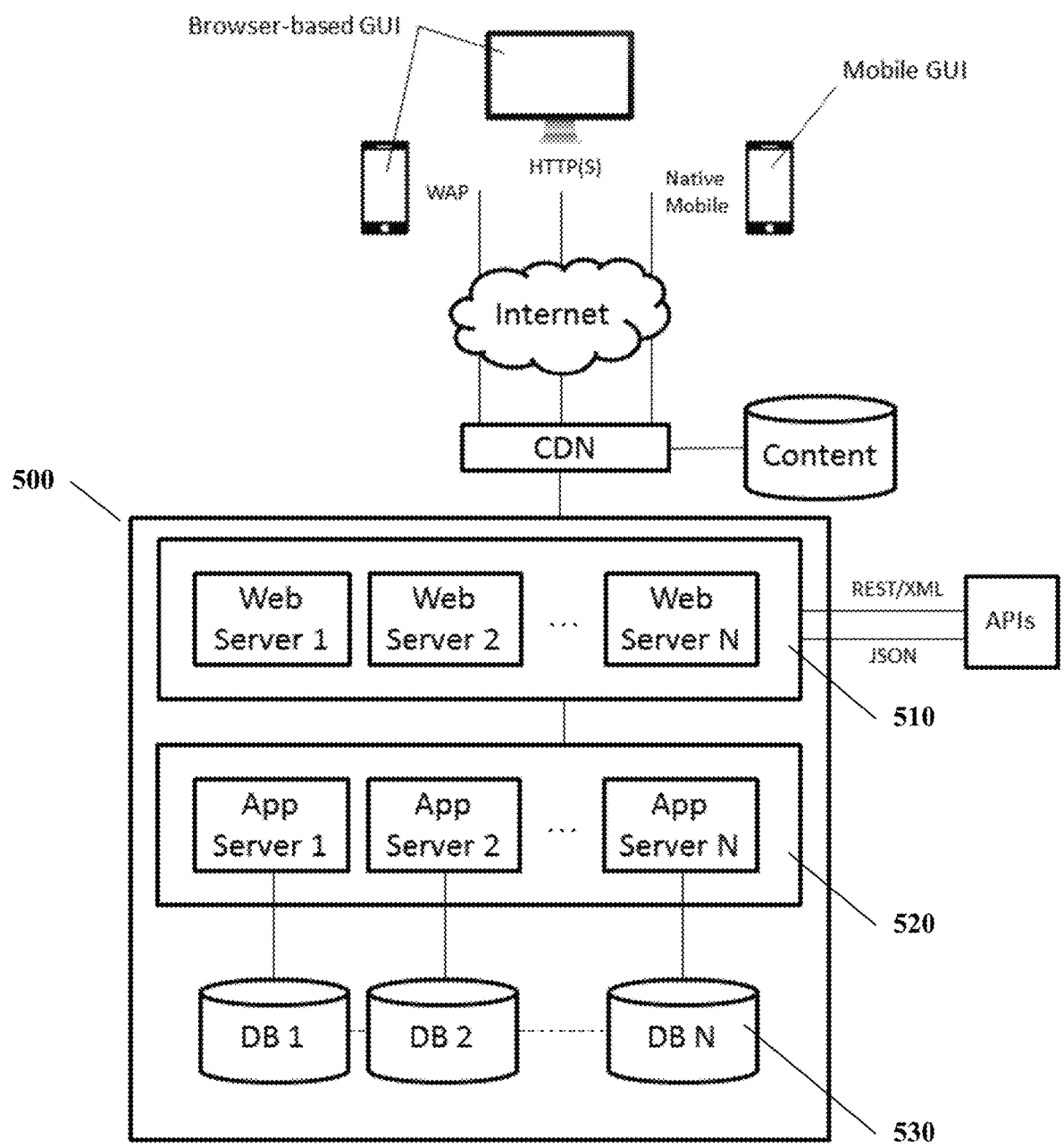
FIG. 5 depicts an example of a cloud-based web/mobile application provision system.

Referring to FIG. 5, in a particular embodiment, an application provision system alternatively has a distributed, cloud-based architecture 500 and comprises elastically load balanced, auto-scaling web server resources 510 and application server resources 520 as well synchronously replicated databases 530.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques using hardware, languages, and development environments. Mobile applications can be written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm OS SDK, Symbian SDK, webOS SDK, and Windows® Mobile SDK.

Several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Web browser plug-ins can include, Adobe® Flash® Player, Microsoft Silverlight, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla Firefox®, Google® Chrome, Apple® Safari®, Opera Software® Opera, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla Firefox® for mobile, Microsoft® Internet Explorer® Mobile, Amazon® Kindle® Basic Web, Nokia Browser, Opera Software® Opera Mobile, and Sony® PSP™ browser.

Software Modules

In some embodiments, the platforms, systems, media, and methods disclosed herein include software, server, and/or database modules, or use of the same. In view of the disclosure provided herein, software modules can be created by techniques using machines, software, and languages. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, many databases are suitable for storage and retrieval of data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

Machine Learning, Risk (Appetite) Endpoint, and Internal Services

The insurance-related transactions that are performed by the platform described herein may include, for example, providing of quotes (quoting), finalizing/binding of quotes, policy management, and pulling of support data. The platform performs the insurance-related transactions using a same backend service architecture of FIG. 1. For example, providing of quotes (quoting) may utilize a risk assessment model to determine the risk, or appetite, associated with an insurance-related transaction for a user. The risk assessment model may determine the risk, or appetite, for the insurance related-related transaction, thereby, allowing the platform to use risk to determine, in part, the quote for the user. The risk assessment model may be associated with, for example, the internal services module of FIG. 1.

The risk assessment model of the internal services module of FIG. 1 may utilize, for example, a modeling engine, a model deployment manager, a performance monitoring engine, and/or a model development engine to provide the platform a risk, or an appetite, for an insurance-related transaction. Multiple models may be developed, trained, and initially tested in the model development engine, then tested with live production data as shadow models in the performance monitoring engine, with the results compared over time against other the other shadow models as well as the production models. This comparison of results can result in production models being replaced by shadow models that have statistically significant better results over time. Based on this process and the learnings of which models perform best over time, better models can be developed, trained, and initially tested in the model development engine and the process of testing and replacing models repeated. This is a dynamic feedback loop that may result in a continuously improving process of assessing risks for insurance-related transactions.

The risk assessment model of the internal services module of FIG. 1 may utilize several different types of models for performing various parts of providing of quotes (quoting), finalizing/binding of quotes, policy management, and pulling of support data. In some embodiments, the platform described herein utilizes machine learning algorithms to classify risk, or appetite, associated with an insurance-related transaction for a user. Many statistical classification techniques are suitable as approaches to perform the risk classification. Such methods include but are not limited to supervised learning approaches.

Commonly used supervised classifiers may include, without limitation, the neural network (e.g., artificial neural network, multi-layer perceptron), support vector machines, k-nearest neighbors, Gaussian mixture model, Gaussian, naive Bayes, decision tree and radial basis function (RBF) classifiers. Linear classification methods include Fisher's linear discriminant, logistic regression, naive Bayes classifier, perceptron, and support vector machines (SVMs). Other classifiers for use with methods according to the disclosure include quadratic classifiers, k-nearest neighbor, boosting, decision trees, random forests, neural networks, pattern recognition, Bayesian networks and Hidden Markov models. Other classifiers, including improvements or combinations of any of these, commonly used for supervised learning, can also be suitable for use with the methods described herein.

Classification of risk, or appetite, using supervised methods can generally be performed by the following methodology: 1) Gather a training set. The training samples are used to train the classifier. 2) Determine the input feature representation of the learned function. The accuracy of the learned function depends on how the input object is represented. Typically, the input object is transformed into a feature vector, which contains a number of features that are descriptive of the object. 3) Determine the structure of the learned function and corresponding learning algorithm. A learning algorithm is chosen, e.g., artificial neural networks, decision trees, Bayes classifiers, or support vector machines. The learning algorithm is used to build the classifier. 4). Build the classifier. The learning algorithm is run on the gathered training set. Parameters of the learning algorithm may be adjusted by optimizing performance on a validation subset of the training set or via cross-validation. After parameter adjustment and learning, the performance of the algorithm may be measured on a test set of naive samples that is separate from the training set. The built model can involve feature coefficients or importance measures assigned to individual features. Once the classifier is trained as above, it can be used to classify a sample, e.g., a risk associated with an insurance-related transaction for a user.

EXAMPLES

The following illustrative examples are representative of embodiments of the platform, software applications, systems, or methods described herein and are not meant to be limiting in any way.

Example 1—Quick Quote—Single Location, One Class Code

A user associated with the platform described herein or a user associated with a partner API may request a new quote. The user submits a request for a quote by including a request type header and a request type body. The request type header includes a POST statement that includes the word, quote, indicating that the user requests a create quote type. Additionally, the request type header includes the user's secure token which authenticates the user. The request body includes fields and data for those fields. The fields may include quote id, effective date, expiration date, years in business, agency, named insureds, locations, or rate classes, or a combination thereof. The agency field may additionally include agency code. The named insureds field may additionally include company name or federal employer identification number (FEIN). The location field may additionally include whether the location is a primary location, number of employees, or company address. The rate classes field may additionally include class code, class code description, or payroll amount.

After receiving the request type through the platform described herein, the DAS API converts the data of the request type to a backend quote that is processable by the backend service architecture of the platform. The backend service architecture then uses internal services, as shown in FIG. 1, to create a quote. After creation, the platform then converts the quote to API JSON so that the platform may provide a response to the user.

The response type may not include a response header but may include a response body. The response body includes fields and data for those fields. The fields may include quote identification, success of quoting, status of quote, policy number, policy uniform resource locator (URL), effective date, expiration date, state for the policy, years in business, total premium, commission percent, underwriting company, underwriting company NAIC code, underwriting company code, agency, named insureds, coverage limits, payment plan, available payment plans, prompted questions, state modifiers, rating summary, or attachments, or a combination thereof.

While preferred embodiments of the present disclosure have been shown and described herein, it will be obvious that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur without departing from the present disclosure. Furthermore, it shall be understood that all aspects of the present disclosure are not limited to the specific depictions, configurations or relative proportions set forth herein which depend upon a variety of conditions and variables. It can be understood that various alternatives to the embodiments of the present disclosure described herein may be employed in practicing the present disclosure. It is therefore contemplated that the present disclosure shall also cover any such alternatives, modifications, variations or equivalents. It is intended that the following claims define the scope of the present disclosure and that methods and structures within the scope of these claims and their equivalents be covered thereby.

What is claimed is:

1. A platform comprising:
an integrated application programming interface (API) that is configured to receive a request from a user to connect to and/or utilize a plurality of modules of a same backend service architecture, the same backend service architecture comprising one or more processors that execute an application stored in memory to train and update a machine learning (ML) model, wherein the one or more processors execute the application to train and update the ML model for determining a classification of the user by:
(a) receiving (i) the request comprising at least a document request, (ii) an input representing a type of user comprising at least a comparative rating of the user, and (iii) features determined from a request or an input of other users;
(b) creating a first training set comprising at least the request, the input, and the features for training a shadow ML model;
(c) training the shadow ML model using at least the first training set to determine a first classification of the user;
(d) creating a second training set comprising at least the first classification and the first training set, wherein the second training set is created when the first classification improves the classification of the user determined by the ML model in a statistically significant way;
(e) training the ML model using the second training set to determine the classification of the user;
(f) providing the classification of the user for use by the plurality of modules of the same backend service architecture;
a process module configured to process the classification of the user, by the one or more processors, to determine at least one document which fulfills the request of the user based at least on the classification of the user and the type of user;
a translation module configured to translate the at least one document, by the one or more processors, into a data structure useable for further processing by the plurality of modules of the same backend service architecture; and
a services module configured to, by the one or more processors, (i) use the data structure to generate the at least one document comprising a structured document based at least on the classification of the user and the type of user and (ii)
at least push the structured document to the integrated API thereby allowing the request of the user to be fulfilled request in real time.

2. The platform of claim 1, wherein the type of user comprises (1) one or more insurance agencies and/or agents associated with the agencies, (2) one or more third party comparative rating entities, (3) one or more companies that have insurance needs, (4) one or more direct consumers that have insurance needs, or (5) the user that has insurance needs.

3. The platform of claim 2, wherein the integrated API is configured to connect directly with other partner APIs that are associated with (1) the one or more insurance agencies and/or the agents associated with the agencies or (2) the one or more third party comparative rating entities.

4. The platform of claim 2, wherein the at least one document is associated with insurance-related transactions that are conducted using the platform, and wherein the insurance-related transactions comprise providing of quotes (quoting), finalizing/binding of quotes, self-service policy management, and pulling of support data.

5. The platform of claim 4, wherein the providing of quotes (quoting) is performed by the one or more insurance agencies and/or the agents associated with the agencies, in response to insurance-related inquiries or requests from (1) the one or more companies, (2) the one or more third party comparative rating entities, (3) the one or more direct consumers, and/or (4) the user.

6. The platform of claim 5, wherein the integrated API is configured to push the at least one document comprising the quotes to (1) the one or more companies, (2) the one or more third party comparative rating entities, (3) the one or more direct consumers, and/or (4) the user.

7. The platform of claim 6, wherein the integrated API is configured to enable the one or more third party comparative rating entities to push the at least one document comprising the quotes to the one or more companies, the one or more direct consumers, and/or the user.

8. The platform of claim 7, wherein the platform is configured to enable the at least one document comprising the quotes to be finalized/bound in real time upon acceptance of the quotes by the one or more companies through the platform.

9. The platform of claim 8, wherein the platform is configured to enable the at least one document comprising the quotes to be finalized/bound in real time upon acceptance of the quotes by the one or more direct consumers and/or the user through the platform.

10. The platform of claim 9, wherein the platform is configured to facilitate transfer of insurance premium payments upon the at least one document comprising the quotes being finalized or bound.

11. The platform of claim 4, wherein the self-service policy management comprises access to the at least one document, policy documents, endorsements, renewals and/or other related policy functions.

12. The platform of claim 2, wherein the integrated API is configured to (1) process and direct a plurality of request types and (2) generate a plurality of response types by, to, or between the different types of users.

13. The platform of claim 12, wherein the request types comprise one or more of the following quote-related actions: create quote, change quote, quote inquiry, quote not taken, bind quote, refer quote, list quote documents, add quote documents, delete quote documents, or get quote status.

14. The platform of claim 12, wherein the request types comprise one or more of the following policy-related actions: get policy documents, list policy documents, policy inquiry, list payment profile, update policy data, make payments, or get policy status.

15. The platform of claim 12, wherein the request types comprise one or more of the following data management-related actions: validate agency code, validate agent code, get class appetite, list industry groups, get questions, or get state modifiers.

16. The platform of claim 1, wherein the trained ML model is a neural network developed using a dynamic feedback loop of connected modules of the same backend service architecture comprising:
a modeling development module configured to generate the shadow ML model;
a performance monitoring module configured to (1) determine performance of the shadow ML model with live production data and (2) select a best performing shadow ML model for updating the trained ML model; and
a model deployment module configured to deploy the updated ML model for use by the services module.

17. The platform of claim 1, wherein the at least one document is associated with insurance-related transactions, wherein the insurance-related transactions comprise a workflow that includes pre-bind and post-bind activities for quotes, and wherein the pre-bind activities include pre-quotes and actual quoting.

18. The platform of claim 1, wherein the integrated API is a representational state transfer (REST) interface that allows integration and exchange of data associated with the at least one document for providing insurance-related transactions amongst different types of users.

19. The platform of claim 1, wherein the platform is implemented as an Insurance-as-a-Service (IaaS) over a cloud network.

20. The platform of claim 1, wherein the services module further comprises an artificial neural network (ANN) configured to generate the structured document comprising a structured quote for use by a quote module of the same backend service architecture, wherein the structured quote comprises a header and a body.

21. The platform of claim 20, wherein the header comprises a request type and a secure token used to authenticate the user.

22. The platform of claim 20, wherein the body comprises a quote identification, a success of quoting, a status of quote, a policy number, a policy uniform resource locator (URL), an effective date, an expiration date, a state for a policy, years in business, a total premium, a commission percent, an underwriting company, an underwriting company NAIC code, an underwriting company code, an agency, a named insured, coverage limits, a payment plan, available payment plans, state modifiers, a rating summary, attachments, or a combination thereof.

* * * * *